(12) United States Patent
Watanabe et al.

(10) Patent No.: US 12,085,580 B2
(45) Date of Patent: Sep. 10, 2024

(54) AUTOMATIC SUITABILITY DETERMINATION SYSTEM

(71) Applicant: SHIMADZU CORPORATION, Kyoto (JP)

(72) Inventors: Satoru Watanabe, Kyoto (JP); Takeshi Yoshida, Kyoto (JP); Fuyuki Okamoto, Kyoto (JP); Yuma Okabe, Kyoto (JP); Chihiro Yasui, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 773 days.

(21) Appl. No.: 17/277,784

(22) PCT Filed: Sep. 27, 2018

(86) PCT No.: PCT/JP2018/035829
§ 371 (c)(1),
(2) Date: Mar. 19, 2021

(87) PCT Pub. No.: WO2020/065804
PCT Pub. Date: Apr. 2, 2020

(65) Prior Publication Data
US 2021/0349113 A1 Nov. 11, 2021

(51) Int. Cl.
*G01N 35/00* (2006.01)
*G05B 23/02* (2006.01)
*G07C 3/00* (2006.01)

(52) U.S. Cl.
CPC ......... *G01N 35/00712* (2013.01); *G07C 3/00* (2013.01); *G05B 23/02* (2013.01)

(58) Field of Classification Search
CPC .................................. G07C 3/00; G05B 23/02
See application file for complete search history.

(56) References Cited

U.S. PATENT DOCUMENTS

| 5,757,659 A | 5/1998 | Arai et al. |
| 2014/0041059 A1 | 2/2014 | Tsujii |

(Continued)

FOREIGN PATENT DOCUMENTS

| CN | 103575856 A | 2/2014 | |
| EP | 2919015 A1 * | 9/2015 | ....... G01N 35/00623 |
| JP | 2018-10016 A | 1/2018 | |

OTHER PUBLICATIONS

International Search Report for corresponding Application No. PCT/JP2018/035829, mailed Dec. 18, 2018.
(Continued)

*Primary Examiner* — Nabil H Syed
*Assistant Examiner* — Cal J Eustaquio
(74) *Attorney, Agent, or Firm* — Renner, Otto, Boisselle & Sklar, LLP

(57) ABSTRACT

The automatic suitability determination system includes a check document storing part, a check document retrieving part, a determination test execution part, and a suitability determination part. The check document storing part stores suitability check documents. The check document retrieving part is configured to read out the suitability check document related to a determining target component of operational suitability from the check document storing part. The determination test execution part is configured to read information contained in the suitability check document read out by the check document retrieving part and to execute tests of suitability determination items specified in the suitability check document by making the determining target component of the operational suitability operate based on the information. The suitability determination part is configured to determine, based on results of the tests executed by the determination test execution part, suitability for the suitability determination items corresponding to the tests.

10 Claims, 3 Drawing Sheets

(56) References Cited

U.S. PATENT DOCUMENTS

2015/0293134 A1    10/2015  Matsumoto et al.
2016/0062740 A1*    3/2016  Muthusamy ........ G06F 9/44589
                                                717/121

OTHER PUBLICATIONS

Written Opinion for corresponding Application No. PCT/JP2018/035829, mailed Dec. 18, 2018 (machine translation).
Office Action for corresponding Japanese Application No. 2020-547699 dated Nov. 4, 2022, with English language translation.
Office Action for corresponding Chinese Application No. 201880096726.6 issued Dec. 22, 2023, with English machine translation.

* cited by examiner

AUTOMATIC SUITABILITY DETERMINATION SYSTEM

TECHNICAL FIELD

The present invention relates to an automatic suitability determination system for automatically determining operational suitability of components constituting an analysis system.

BACKGROUND ART

After construction and installation of an analysis system, an engineer generally performs operational suitability determination to check whether the analysis system operates correctly. Procedures and criteria for performing the operational suitability determination are strictly specified and documented for each component constituting the analysis system. Hereinafter, a document that specifies the procedures and criteria for performing the operational suitability determination is referred to as a suitability check document.

For example, the engineer uses a notebook personal computer to open the suitability check document for a determination target component, operates the component while referring to the document, and determines, based on numerical values and the like obtained by making the component execute specified operations, whether the component operates suitably.

SUMMARY OF THE INVENTION

Problems to be Solved by the Invention

As described above, an engineer generally determines the operational suitability of an analysis system by conducting tests while referring to a check document prepared in advance and by evaluating numerical values and the like obtained by the tests, which causes problems of complicated determination work and occurrence of human error. Especially, in an analysis system including a combination of a large number of components, such as a liquid chromatography analysis system (hereinafter, referred to as an LC system), it is necessary to operate an apparatus while checking the suitability check documents different for each component and to perform the determination. This increases a risk of human error.

For the above reason, it is preferable to automate the determination of the operational suitability of an analysis system. However, an analysis system such as an LC system is constituted by different types and number of components depending on specifications required by customers. Thus, it is necessary to prepare determination automation software for automatically performing the operational suitability of an analysis system according to a component configuration of the analysis system.

The present invention has been made in view of the above problems, and an object of the present invention is to achieve versatile automation of the determination of the operational suitability of components constituting an analysis system without preparing the determination automation software according to the configuration of the analysis system.

Solution to the Problems

The present invention is an automatic suitability determination system that is incorporated in a computer capable of two-way communication with an analysis system and is configured to automatically determine operational suitability of components constituting the analysis system, the automatic suitability determination system including a check document storing part, a check document retrieving part, a determination test execution part, and a suitability determination part. The check document storing part stores suitability check documents that are electronic documents having information on tests for determining the operational suitability of the components constituting the analysis system. The check document retrieving part is configured to read out the suitability check document related to a determining target component of the operational suitability from the check document storing part. The determination test execution part is configured to read the information contained in the suitability check document read out by the check document retrieving part and to execute tests of suitability determination items specified in the suitability check document by making the determining target component of the operational suitability operate based on the information. The suitability determination part is configured to determine, based on results of the tests executed by the determination test execution part, suitability for the suitability determination items corresponding to the tests.

That is, simply by preparing in advance suitability check documents for components constituting the analysis system and by making the check document storing part store them, the automatic suitability determination system according to the present invention is configured to read out the suitability check document, to read the information contained in the suitability check document, to automatically execute the tests of the specified suitability determination items, and further to determine the suitability. Therefore, for automating the determination of the operational suitability of components constituting the analysis system, it is only necessary to prepare suitability check documents for the components. Thus, it is not necessary to create the determination automation software according to the configuration of the analysis system.

The "component" herein is a concept including all the constituent elements constituting the analysis system, for example, in the case of the LC system, such as a liquid feed pump, an auto sampler, a column oven, and a detector, as well as a system controller and a data processing device that perform operational management of each constituent element. Thus, targets of determining the operational suitability include not only hardware such as the liquid feed pump, the auto sampler, the column oven, and the detector, but also software installed in the system controller and the data processing device.

In a preferred embodiment, the check document storing part stores a plurality of the suitability check documents for a plurality of types of components including the components constituting the analysis system, the automatic suitability determination system further includes a component configuration detector configured to detect a component configuration of the analysis system, and the check document retrieving part is configured to read out the suitability check documents for the components constituting the analysis system from the check document storing part based on the component configuration detected by the component configuration detector. In this way, the plurality of types of components (more components than components constituting one analysis system) are stored in the check document storing part, and only the suitability check documents according to the configuration of the analysis system are read out, resulting in improved versatility of the automatic suitability determination system.

In the above case, the check document retrieving part may be configured to display a list of the suitability check documents that apply to the component configuration detected by the component configuration detector to require an operator of the automatic suitability determination system to select the suitability check documents to be read out, and to read out the suitability check documents selected by the operator from the check document storing part.

Further, an engineer is to conventionally create a report by entering determination results of the operational suitability in a predetermined entry field of the suitability check document, which also brings the risk of human error. Thus, in the present invention, it is preferable to include a report creation part configured to create a verification result report describing a determination result by the suitability determination part. This can allow for automatic creation of a report describing a determination result to prevent the occurrence of human error.

In the above case, it is preferable to further include a rewrite prohibition part configured to prohibit rewriting of the determination result described in the verification result report. This can disable rewriting of the contents of the verification result report created by the report creation part to prevent falsification of the report.

Further, it is preferable that the report creation part is configured to attach data of the results of the tests that are a basis of the determination result described in the verification result report to the verification result report. This allows for automatic attachment of data supporting the determination result to the verification result report, leading to improved reliability of the verification result report.

Further, it is preferable that the check document storing part is configured to be able to additionally store new suitability check documents that have not been stored by the check document storing part. This can realize, when there is a new component, automation of determination of the operational suitability of that component simply by adding a suitability check document for the component to the check document storing part, without need for modification of the automatic suitability determination system itself (software).

In a preferred embodiment, the automatic suitability determination system further includes an execution procedure storage part that stores an execution procedure of the tests of the suitability determination items together with identification information (ID) of the suitability determination items. The identification information of the suitability determination items to be executed are embedded in the suitability check documents, and the determination test execution part is configured to identify the suitability determination items to be executed based on the identification information embedded in the suitability check documents, and to execute the tests of the identified suitability determination items based on the execution procedure stored in the execution procedure storage part.

Further, in a preferred embodiment, the suitability check documents have condition values necessary for executing the tests of the suitability determination items to be executed, the condition values being embedded in association with the identification information, and the determination test execution part is configured to execute the tests of the suitability determination items using the condition value embedded in the suitability check documents.

Further, in a preferred embodiment, the suitability check documents have reference values necessary for determining the suitability for the suitability determination items to be executed, the reference value being embedded in association with the identification information, and the suitability determination part is configured to determine the suitability for the suitability determination items using the reference values embedded in the suitability check documents.

Effects of the Invention

The automatic suitability determination system according to the present invention is configured to, simply by preparing suitability check documents for components constituting the analysis system and by making the check documents storing part store them, automatically execute tests of specified suitability determination items and determine the operational suitability. Therefore, for automating the determination of the operational suitability of components, it is only necessary to prepare suitability check documents for the components, and it is not necessary to create the determination automation software according to the configuration of the analysis system.

EMBODIMENT OF THE INVENTION

Hereinafter, an exemplary embodiment of an automatic suitability determination system according to the present invention will be described with reference to the drawings.

Figure 1:
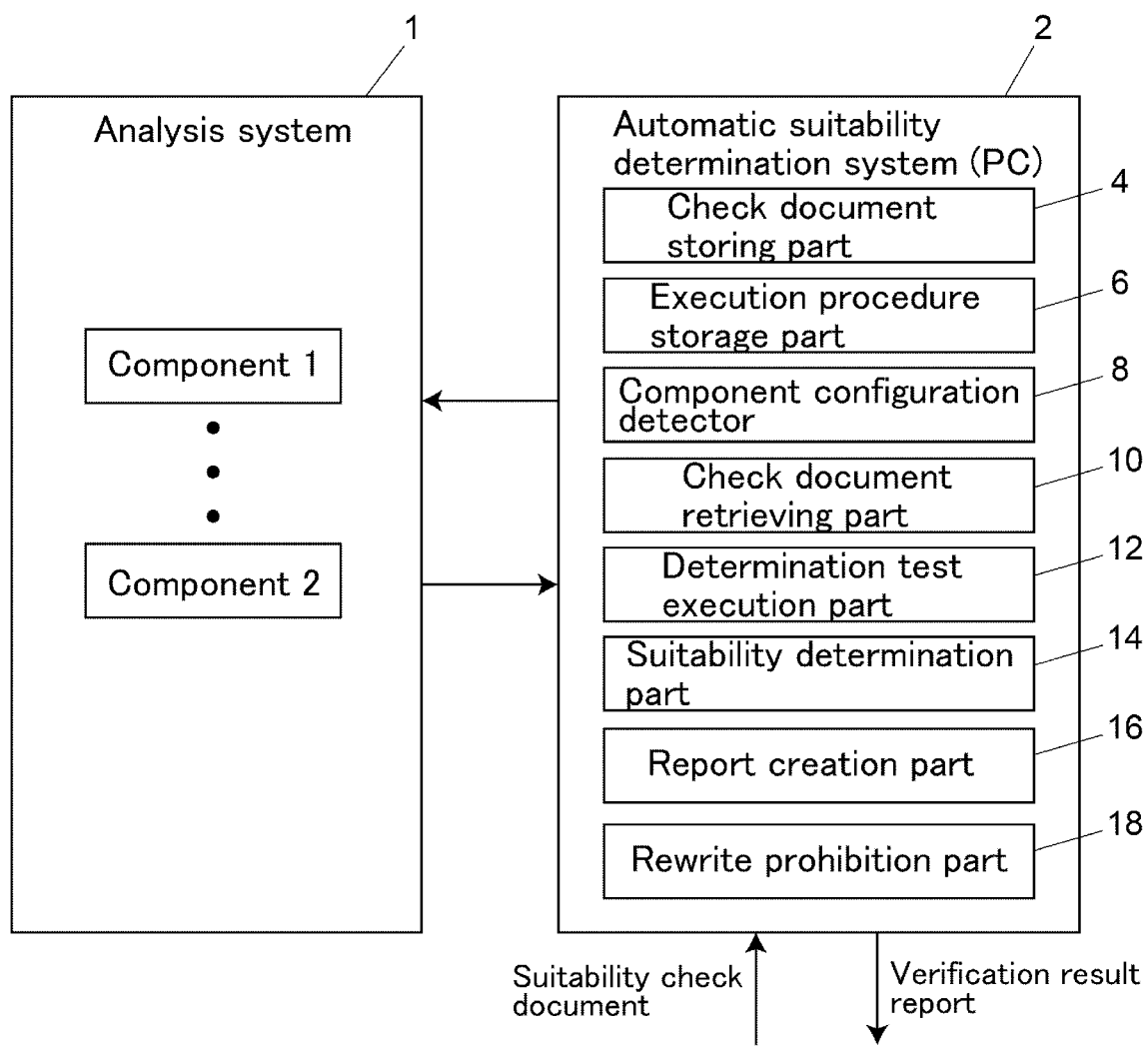
FIG. 1 is a block diagram schematically showing an exemplary embodiment of an automatic suitability determination system.

As shown in FIG. 1, an automatic suitability determination system 2 is incorporated in a computer such as a personal computer (PC) capable of two-way communication with an analysis system 1. The analysis system 1 of this exemplary embodiment is constituted by a plurality of components 1 to N. When the analysis system 1 is an LC system, the components are respectively a liquid feed pump, an auto sampler, a column oven, a detector, a system controller, a computer for arithmetic processing, and the like. The automatic suitability determination system 2 is a system for automatically determining operational suitability for any of the components 1 to N constituting the analysis system 1 as to whether the components operate properly.

The automatic suitability determination system 2 includes a check document storing part 4, an execution procedure storage part 6, a component configuration detector 8, a check document retrieving part 10, a determination test execution part 12, a suitability determination part 14, a report creation part 16, and a rewrite prohibition part 18. The check document storing part 4 and the execution procedure storage part 6 are functions realized by a storage amount of a part of a storage device included in the computer in which the automatic suitability determination system 2 is incorporated. The component configuration detector 8, the check document retrieving part 10, the determination test execution part 12, the suitability determination part 14, the report creation part 16, and the rewrite prohibition part 18 are functions obtained by programs being executed by arithmetic elements included in the computer in which the automatic suitability determination system 2 is incorporated.

The check document storing part 4 stores a suitability check document for at least a part of the components 1 to N of the analysis system 1. The suitability check document, which is prepared for each component, is an electronic document in PDF format or the like describing a test item (suitability determination item) to be executed for determining the operational suitability of the corresponding component, an execution procedure of the suitability determination item, a condition value for conducting the test, and a reference value for the determination.

An engineer has conventionally operated a target component to conduct the test of the specified suitability determination item while referring to the suitability check document, and determined the operational suitability by comparing a result of the test with the reference value specified in the suitability check document.

In this exemplary embodiment, the information such as ID, the condition value, and the reference value for the suitability determination item is embedded as field information in the suitability check document. The determination test execution part 12 and the suitability determination part 14 described later read the field information to automatically operate the target component, and automatically execute the test and the determination of the operational suitability.

It is possible to make the check document storing part 4 store a new suitability check document, and also to update the contents of the existing suitability check document. The component configuration of the analysis system 1, that is, what kind of component combination is included in the analysis system 1 changes depending on specifications required by customers. It is thus preferable that the check document storing part 4 stores not only the suitability check documents for the components 1 to N actually constituting the analysis system 1 but also suitability check documents for other components.

The component configuration detector 8 is configured to detect the components 1 to N actually constituting the analysis system 1 by communicating with the analysis system 1.

The check document retrieving part 10 is configured to search for the suitability check documents corresponding to the components 1 to N of the analysis system 1 detected by the component configuration detector 8 from the suitability check documents stored in the check document storing part 4, and to read out the suitability check document of the target component of determining the operational suitability.

In a preferred embodiment, the check document retrieving part 10 is configured to search for the suitability check documents associated with component IDs of the components 1 to N constituting the analysis system 1, to display a list of the associated suitability check documents to allow an operator of the automatic suitability determination system 2 to select a suitability check document to be read out (that is, a component for which determination of the operational suitability is to be executed), and to read out the suitability check document selected by the operator from the check document storing part 4.

The determination test execution part 12 is configured to read the ID of the suitability determination items to be executed and condition values for the tests of the items that are embedded in the suitability check document read out by the check document retrieving part 10, and to execute the tests of the suitability determination items specified for the target component. The execution procedures of the tests of the suitability determination items are stored in the execution procedure storage part 6 in association with the ID of the suitability determination items. Based on the ID of the suitability determination items read from the suitability check document, the determination test execution part 12 is configured to read out the execution procedures for the items from the execution procedure storage part 6, and to conduct the tests of the items according to the procedures.

Note that, if information on the execution procedures of the tests of the suitability determination items are embedded in the suitability check document, the determination test execution part 12 can execute the tests of the suitability determination items by reading the information, and thus the execution procedure storage part 6 is not a necessary constituent element.

The suitability determination part 14 is configured to determine the suitability for each suitability determination item by comparing a test result of the item executed by the determination test execution part 12 with the reference value for that item read from the suitability check document.

The report creation part 16 is configured to create a verification result report describing determination results of the suitability determination items by the suitability determination part 14. In a preferred embodiment, it is preferable that the report creation part 16 is configured to attach data of the test results that are bases of the determination results of the suitability determination items to the verification result report. The verification result report created by the report creation part 16 may be the suitability check document with the determination results entered in entry fields thereof.

The rewrite prohibition part 18 is configured to perform a process of prohibiting rewriting of the contents described in the verification result report created by the report creation part 16, for example, a process of making the verification result report read-only.

Next, a sequential flow by the automatic suitability determination system 2 up to execution of a suitability determination test will be described with reference to the flowchart of FIG. 2.

When the operational suitability is determined for the components constituting the analysis system 1, first, the component configuration detector 8 detects the component configuration of the analysis system 1 (step S1). In this exemplary embodiment, the configuration where the analysis system 1 is constituted by the components 1 to N is detected.

The check document retrieving part 10 searches for the suitability check documents corresponding to the components 1 to N detected by the component configuration detector 8 and displays a list of the corresponding suitability check documents (step S2), and allows an operator of the system 2 to select a suitability check document to be read out (step S3). The check document retrieving part 10 reads out the suitability check document selected by the operator from the check document storing part 4 (step S4). After the check document retrieving part reads out the suitability check document, the determination test execution part 12 operates a target component to execute the tests of predetermined suitability determination items using the information (for example, the information embedded as field information) contained in the suitability check document and the execution procedures stored in the execution procedure storage part 6 (step S5). After the determination test execution part 12 executes the tests for the items, the suitability determination part 14 determines the suitability based on results obtained from the tests.

If there is another component for which the operational suitability is to be determined, steps S3 to S5 are repeatedly executed, and if there is no component for which the operational suitability is to be determined, the processing ends (step S6).

Figure 3:
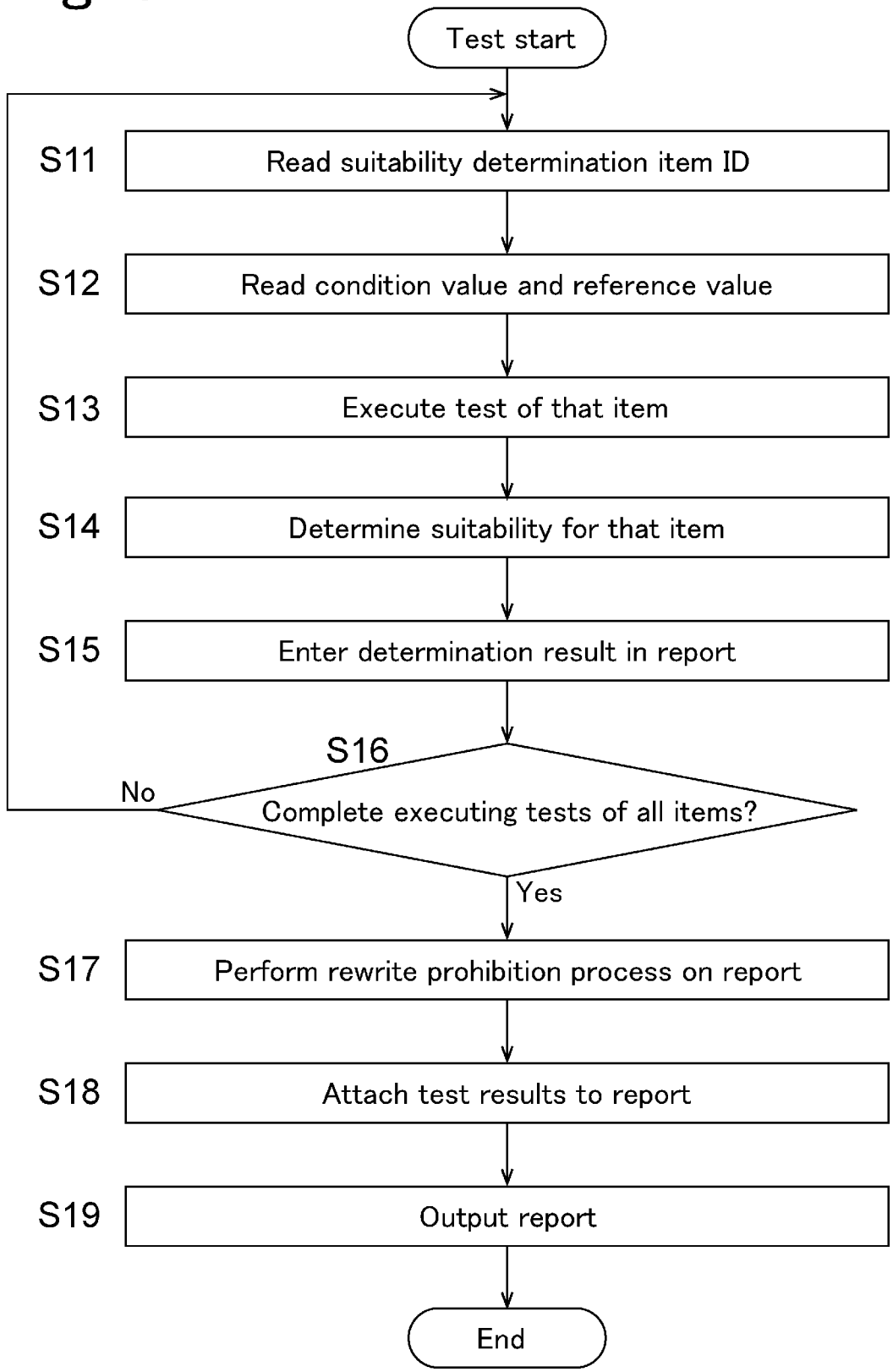
FIG. 3 is a flowchart showing exemplary operation in a test for the suitability determination according to the same exemplary embodiment.

Next, sequential operations from the test for determining the operational suitability of a component to output of a verification result report (hereinafter, referred to as a report) will be described with reference to the flowchart of FIG. 3.

Figure 2:
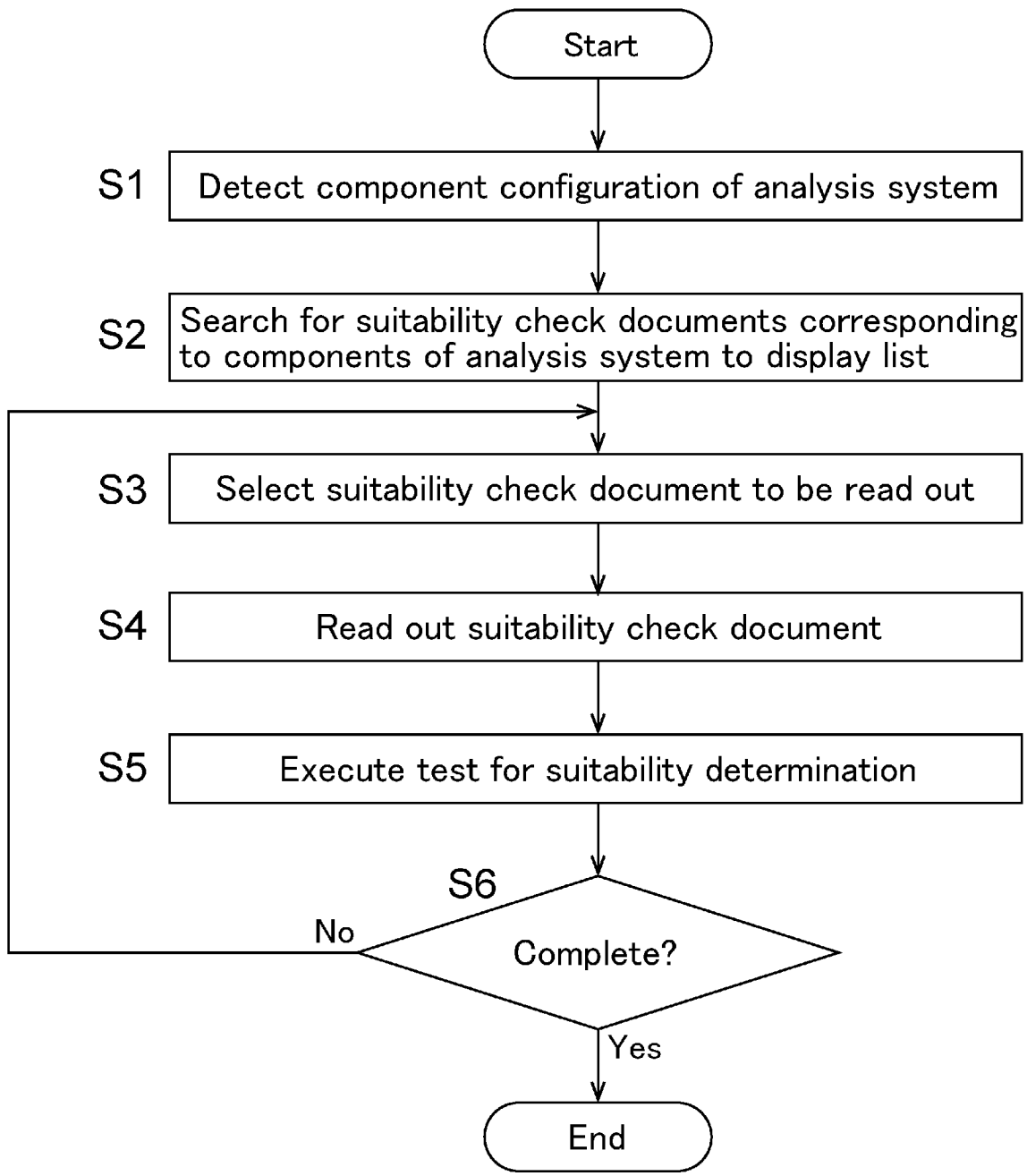
FIG. 2 is a flowchart showing exemplary operation of suitability determination of an analysis system according to the same exemplary embodiment.

When the operator of the system 2 selects the suitability check document to be read out in step S3 in the flowchart of FIG. 2, the determination test execution part reads the suitability determination item ID, the condition value, and the reference value that are embedded in the suitability check document (steps S11 and S12), and conducts the test according to the execution procedure for that item stored in the execution procedure storage part 6 (step S13). The suitability determination part 14 determines the suitability for that item based on a result of the test conducted by the determination test execution part 12 (step S14). The report creation part 16 enters a determination result of that item by the suitability determination part 14 in the report (step S15).

The above operations S11 to S15 are executed in sequence for all the suitability determination items specified in the suitability check document (step S16). After the determination results for all the items are entered in the report, the rewrite prohibition part 18 performs the rewrite prohibition process on the report (step S17). Further, the report creation part 16 attaches data of the test results of the items to the created report (step S18), and outputs the report as a document such as a PDF file (step S19).

DESCRIPTION OF REFERENCE SIGNS

1: Analysis system
2: Automatic suitability determination system
4: Check document storing part
6: Execution procedure storage part
8: Component configuration detector
10: Check document retrieving part
12: Determination test execution part
14: Suitability determination part
16: Report creation part
18: Rewrite prohibition part

The invention claimed is:

1. An automatic suitability determination system incorporated into a computer configured for two-way communication with a chromatograph system and for automatically determining operational suitability of components constituting the chromatograph system, wherein a determination of the operational suitability is to conduct tests of specified suitability determination items and is to compare results of the tests with reference values specified in a suitability check document, the automatic suitability determination system comprising:
a check document storing part that stores suitability check documents that are electronic documents having information on tests for determining the operational suitability of the components constituting the chromatograph system;
a check document retrieving part configured to read out the suitability check document related to a determining target component of the operational suitability from the check document storing part;
a determination test execution part configured to read the information contained in the suitability check document read out by the check document retrieving part and to execute tests of suitability determination items specified in the suitability check document by making the determining target component of the operational suitability operate based on the information; and
a suitability determination part configured to determine, based on results of the tests executed by the determination test execution part, suitability for the suitability determination items corresponding to the tests.

2. The automatic suitability determination system according to claim 1, wherein
the check document storing part stores a plurality of the suitability check documents for a plurality of types of components including the components constituting the chromatograph system,
the automatic suitability determination system further comprises a component configuration detector configured to detect a component configuration of the chromatograph system, and
the check document retrieving part is configured to read out the suitability check documents for the components constituting the analysis system from the check document storing part based on the component configuration detected by the component configuration detector.

3. The automatic suitability determination system according to claim 2, wherein the check document retrieving part is configured to display a list of the suitability check documents that apply to the component configuration detected by the component configuration detector, to require an operator of the automatic suitability determination system to select the suitability check documents to be read out, and to read out the suitability check documents selected by the operator from the check document storing part.

4. The automatic suitability determination system according to claim 1, further comprising a report creation part configured to create a verification result report describing a determination result by the suitability determination part.

5. The automatic suitability determination system according to claim 4, further comprising a rewrite prohibition part configured to prohibit rewriting of the determination result described in the verification result report.

6. The automatic suitability determination system according to claim 4, wherein the report creation part is configured to attach data of the results of the tests that are a basis of the determination result described in the verification result report to the verification result report.

7. The automatic suitability determination system according to claim 1, wherein the check document storing part is configured to be able to additionally store new suitability check documents that have not been stored by the check document storing part.

8. The automatic suitability determination system according to claim 1, further comprising an execution procedure storage part that stores an execution procedure of the tests of the suitability determination items together with identification information of the suitability determination items, wherein
the identification information of the suitability determination items to be executed are embedded in the suitability check documents, and
the determination test execution part is configured to identify the suitability determination items to be executed based on the identification information embedded in the suitability check documents, and to execute the tests of the identified suitability determination items based on the execution procedure stored in the execution procedure storage part.

9. The automatic suitability determination system according to claim 8, wherein the suitability check documents have condition values necessary for executing the tests of the suitability determination items to be executed, the condition values being embedded in association with the identification information, and the determination test execution part is configured to execute the tests of the suitability determination items using the condition values embedded in the suitability check documents.

10. The automatic suitability determination system according to claim 8, wherein the suitability check documents have reference values necessary for determining the suitability for the suitability determination items to be executed, the reference values being embedded in association with the identification information, and the suitability determination part is configured to determine the suitability for the suitability determination items using the reference values embedded in the suitability check documents.

\* \* \* \* \*